(12) United States Patent
Patterson et al.

(10) Patent No.: US 9,417,018 B2
(45) Date of Patent: Aug. 16, 2016

(54) MULTI-LAYER PROTECTIVE COATING FOR AN ALUMINUM HEAT EXCHANGER

(71) Applicant: Carrier Corporation, Farmington, CT (US)

(72) Inventors: Matthew Patterson, Syracuse, NY (US); Mark R. Jaworowski, Glastonbury, CT (US); Mary Teresa Lombardo, Windsor, CT (US); Stephanie Bealing, West Hartford, CT (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 14/385,394

(22) PCT Filed: Mar. 11, 2013

(86) PCT No.: PCT/US2013/030132
§ 371 (c)(1),
(2) Date: Sep. 15, 2014

(87) PCT Pub. No.: WO2013/138218
PCT Pub. Date: Sep. 19, 2013

(65) Prior Publication Data
US 2015/0034490 A1    Feb. 5, 2015

Related U.S. Application Data

(60) Provisional application No. 61/611,214, filed on Mar. 15, 2012.

(51) Int. Cl.
*C23C 10/02* (2006.01)
*C23C 10/24* (2006.01)
(Continued)

(52) U.S. Cl.
CPC ............ *F28F 21/084* (2013.01); *C09D 5/4488* (2013.01); *C09D 7/1216* (2013.01);
(Continued)

(58) Field of Classification Search
IPC ............ C25D 13/20,13/22; C23C 28/00, 22/83, C23C 10/02, 10/24, 22/34, 2222/10; C28F 19/06; C09D 5/4488, 7/1216, 175/04; C08G 2150/90
See application file for complete search history.

(56) References Cited

U.S. PATENT DOCUMENTS

| 4,830,101 A | * | 5/1989 | Ohara et al. ............ 165/133 |
| 5,486,283 A | * | 1/1996 | Mnich .............. C25D 11/12 205/174 |

(Continued)

FOREIGN PATENT DOCUMENTS

| CN | 1739866 A | 3/2006 |
| CN | 101321895 A | 12/2008 |

(Continued)

OTHER PUBLICATIONS

"Selected Abstracts of Thermal Spray Literature," Journal of Thermal Spray Technology; vol. 4, No. 3; Sep. 1995; pp. 297-303.
(Continued)

*Primary Examiner* — Kishor Mayekar
(74) *Attorney, Agent, or Firm* — Cantor Colburn LLP

(57) ABSTRACT

A method for coating an aluminum alloy heat exchanger includes subjecting at least one surface of the heat exchanger to a pre-treatment process including cleaning; conversion coating the at least one surface of the heat exchanger with a trivalent chromium compound; and subjecting the at least one conversion coated surface to an electro-coating in an aqueous solution containing an organic corrosion inhibitor.

10 Claims, 1 Drawing Sheet

(51) Int. Cl.
| | |
|---|---|
| C23C 28/00 | (2006.01) |
| F28F 21/08 | (2006.01) |
| C25D 13/20 | (2006.01) |
| C23C 22/34 | (2006.01) |
| C23C 22/83 | (2006.01) |
| F28F 19/06 | (2006.01) |
| C09D 5/44 | (2006.01) |
| C09D 7/12 | (2006.01) |
| C09D 175/04 | (2006.01) |
| C25D 13/22 | (2006.01) |
| C08K 3/24 | (2006.01) |
| C08K 3/30 | (2006.01) |

(52) U.S. Cl.
CPC .............. *C09D175/04* (2013.01); *C23C 10/02* (2013.01); *C23C 10/24* (2013.01); *C23C 22/34* (2013.01); *C23C 22/83* (2013.01); *C23C 28/00* (2013.01); *C25D 13/20* (2013.01); *C25D 13/22* (2013.01); *F28F 19/06* (2013.01); *C08G 2150/90* (2013.01); *C08K 3/24* (2013.01); *C08K 2003/3045* (2013.01); *C23C 2222/10* (2013.01)

(56) References Cited

U.S. PATENT DOCUMENTS

| | | | |
|---|---|---|---|
| 6,375,726 | B1 | 4/2002 | Matzdorf et al. |
| 2002/0042467 | A1* | 4/2002 | Matsukawa et al. .......... 524/493 |
| 2003/0150730 | A1* | 8/2003 | Hartung et al. ............... 204/500 |
| 2003/0185990 | A1 | 10/2003 | Bittner et al. |
| 2006/0237098 | A1 | 10/2006 | Matzdorf et al. |
| 2008/0156647 | A1* | 7/2008 | Briles ........................... 204/479 |
| 2009/0130304 | A1 | 5/2009 | Muth et al. |
| 2009/0142589 | A1 | 6/2009 | Shoji et al. |
| 2011/0293841 | A1 | 12/2011 | Rivera et al. |
| 2012/0186986 | A1 | 7/2012 | Schmidt et al. |

FOREIGN PATENT DOCUMENTS

| | | |
|---|---|---|
| EP | 1992718 A1 | 11/2008 |
| WO | 2009137358 A1 | 11/2009 |
| WO | 2010045657 A1 | 4/2010 |
| WO | 2011012443 A1 | 2/2011 |
| WO | 2011037807 A2 | 3/2011 |

OTHER PUBLICATIONS

"Selected Abstracts of Thermal Spray Literature," Journal of Thermal Spray Technology; vol. 6, No. 3; Sep. 1997; pp. 373-378.

Brundle, C.A., In the News, Publications and Education, Journal of Thermal Spray Technology; vol. 2, No. 2; Jun. 1993; pp. 112-119.

C. Moreau, Flattening and Solidification of Thermally Sprayed Particles, Journal of Thermal Spray Technology, vol. 1, No. 4; Dec. 1992; pp. 317-323.

Doble, et al., "Use of Thermally Sprayed Aluminum in the Norwegian Offshore Industry," Protective Coatings, Europe; vol. 2, No. 4; Apr. 1997, pp. 1-10.

International Preliminary Report on Patentability and Written Opinion of the International Searching Authority regarding related PCT App. No. PCT/US2013/030132, dated Sep. 16, 2014, 7 pgs.

J. Svantesson, et al. "A Study of Ni-5wt.%Al Coatings Produced from Different Feedstock Powder." Journal of Thermal Spray Technology; vol. 1, No. 1, Mar. 1992; pp. 65-70.

K. P. Fischer, Performance History of Thermal-Sprayed Aluminum Coatings in Offshore Service, Journal of Material Performance, vol. 34, No. 4; pp. 27-35.

K. Tani, et al., "Status of Thermal Spray Technology in Japan." Journal of Thermal Spray Technology; vol. 1, No. 4; Dec. 1992; pp. 333-339.

Knuuttila, "Sealing of Thermal Spray Coatings by Impregnation." Journal of Thermal Spray Technology, vol. 8, No. 2; Jun. 1999; pp. 249-257.

Parks, "Aluminum Sprayed Coatings on Board U.S. Navy Ships a Ten Year Overview." Proceedings of the National Thermal Spray Conference, 1987. pp. 389-392.

Pawlowski, "The Science and Engineering of Thermal Spray." The Science and Engineering of Thermal Spray, Book Published by Chichester, New York: Wiley, C1995, pp. 334-335.

Sampson, "The Last Word-The "Job Shop" Forum," Journal of Thermal Spray Technology; vol. 7, No. 4; Dec. 1998; pp. 477-478.

Sampson, E.R., et al., "Arc Spray Process for the Aircraft and Stationary Gas Turbine Industry." Journal of Thermal Spray Technology; vol. 6, No. 2, Jun. 1997; pp. 150-152.

Sampson, Elliott R., et al. "Arc Spray Corrosion Application." National Association of Corrosion Engineers 1998; No. 518; pp. 518/1-518/5.

Selected Abstracts of Thermal Spray Literature Dec. 1990-Dec. 1991, Journal of Thermal Spray Technology, vol. 1, No. 1; Mar. 1992; pp. 89-91.

Thermal Spray Coatings, Encyclopedia of Electrical and Electronics Engineering, 1998, pp. 40-49.

Thermal Spraying: New Construction and Maintenance, Department of Army, US Army Corps of Engineers, Engineering Manual, Jan. 29, 1999, pp. 1-87.

Xu, et al., "Application of Electric Arc Spraying Technique to Enhance Corrosion Resistance of Steel Structures on Ships." (China Mechanical Engineering Society), Curf. Eng., vol. 11 (No. 1), 1995. p. 38, 40. Selected abstract of Thermal Spray Lite.

Translation of Office Action regarding related CN Application No. 201380014221.8; dated Nov. 4, 2015; 11 pgs.

* cited by examiner

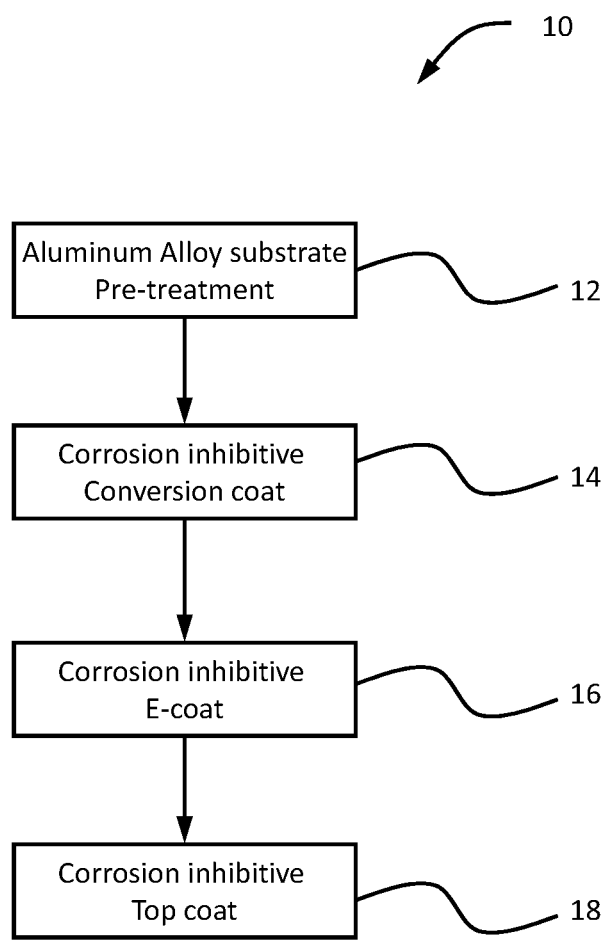

MULTI-LAYER PROTECTIVE COATING FOR AN ALUMINUM HEAT EXCHANGER

CROSS REFERENCE TO RELATED APPLICATION

This patent application is a national stage of PCT Application Serial No. PCT/US13/30132, filed Mar. 11, 2013, which claims priority to U.S. Provisional Patent Application Ser. No. 61/611,214, filed Mar. 15, 2012, which is incorporated herein by reference in their entirety

FIELD OF INVENTION

The subject matter disclosed herein relates generally to the field of deposition of coatings on an aluminum alloy heat exchanger and, more particularly, to applying a multi-layer deposition of coatings and corrosion inhibitors on an aluminum alloy heat exchanger that provides an adherent multi-layered coating with substantial corrosion resistance.

DESCRIPTION OF RELATED ART

Aluminum alloys are mixtures of aluminum with other metals (called an alloy), often, zinc, manganese, silicon, copper, rare earths and zirconium. Aluminum alloys are lightweight, have a high-specific strength and a high-heat conductivity. Due to these excellent mechanical properties, aluminum alloys are used as heat exchangers for heating or cooling systems in commercial, industrial and marine applications. Typical heat exchangers that use an aluminum alloy material are fin, tube and plate heat exchangers.

However, aluminum alloy heat exchangers have a relatively high susceptibility to corrosion. In severe marine applications, particularly, sea water creates an aggressive chloride environment in these heat exchangers. This chloride environment rapidly causes pitting and corrosion of braze joints and fins as well as rupturing refrigerant tubes. The corrosion eventually leads to a loss of refrigerant and failure of the heating or system. To address the issue, multi-layer coatings are applied to the aluminum alloy through conventional methods like spraying or dipping in an attempt to seal the surface from the corrosive environment. However, these multi-layer coatings do not provide satisfactory adhesion durability over the long-term. Additionally, these aluminum coating methods have non-line-of-sight limitations. An improvement in providing a multi-layer protection of an aluminum alloy heat exchanger through coatings and inhibitors would be well received in the art.

BRIEF SUMMARY

According to one aspect of the invention, a method for coating an aluminum alloy heat exchanger includes subjecting at least one surface of the heat exchanger to a pre-treatment process including cleaning; conversion coating the at least one surface of the heat exchanger with a trivalent chromium compound; and subjecting the at least one conversion coated surface to an electro-coating in an aqueous solution containing an organic corrosion inhibitor.

According to another aspect of the invention, a method for coating an aluminum alloy heat exchanger includes subjecting at least one surface of the heat exchanger to a pre-treatment process including cleaning; conversion coating the at least one surface of the heat exchanger with a trivalent chromium compound; subjecting the at least one surface to an electro-coating in an aqueous solution containing an organic corrosion inhibitor; and subjecting the electro-coated heat exchanger to a surface coating including application of a solvent borne solution containing a corrosion inhibitive top coat.

Other aspects, features, and techniques of the invention will become more apparent from the following description taken in conjunction with the drawing.

BRIEF DESCRIPTION OF THE SEVERAL VIEWS OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawing in which:

FIG. 1 depicts a flow chart for an exemplary process of applying a multi-layer coating on an aluminum alloy heat exchanger according to an embodiment of the invention.

DETAILED DESCRIPTION

The present invention is more particularly described in the following description and examples are intended to be illustrative only since numerous modification and variations therein will be apparent to those skilled in the art. As used in the specification and in the claims, the singular form "a", "an" and "the" may include plural referents unless the context clearly dictates otherwise. Also, all ranges disclosed herein are inclusive of the endpoints and are independently combinable.

Embodiments of a method for coating an aluminum heat exchanger includes applying a combination of conversion coatings and corrosion inhibitors through surface treatments and electrophoretic deposition to provide an adherent multi-layered coating with substantial corrosion resistance to the substrate of the heat exchanger. In embodiments, the method provides applying a multi-layer coating of a corrosion inhibitor on an aluminum alloy heat exchanger including a surface pre-treatment of the heat exchanger, a conversion coating, an electro-coating process and an optional surface coating of the heat exchanger. The surface pre-treatment includes at least one step to ensure that the surface of the heat exchanger is clean and free of residues and foreign materials. A coating process enables a film containing a trivalent chromium compound to be uniformly coated on the aluminum alloy heat exchanger substrate using an autocatalytic conversion coating process. Further, the heat exchanger is electro-coated ("e-coated") by applying a film containing corrosion inhibitors on the substrate surface. Also, an optional topcoat application is applied to supplement the corrosion protection on the surface in a solution containing a corrosion inhibitor and polyurethane.

Referring now to the drawings, FIG. 1 illustrates an exemplary process 10 of depositing multi-layer corrosion inhibitors on the surface of a heat exchanger having an aluminum alloy substrate (or substrate). Examples of such alloys include 1000, 3000, 5000, 6000 and 7000 series aluminum alloys. As used in the following description, the surface of the heat exchanger may include, in some non-limiting examples, fins, tubes and/or plates. As shown, the exemplary process is initiated by surface pre-treatment 12 of the substrate during which the substrate undergoes various treatments to yield a surface character suitable for a subsequent conversion coating process. The surface pre-treatment is not only used to remove dirt and organic contaminants from the surface of the aluminum alloy substrate, but also to remove an oxide or a hydroxide formed on the aluminum alloy substrate thereby permitting the surface of the substrate to be exposed for the conversion coating process. According to one exemplary process, the substrate preparation includes removing surface contaminants using a suitable technique such as, in some non-limiting examples, solvent rinsing, vapor degreasing using trichloroethylene or other suitable solvents, solvent emulsion cleaning or the like in order to remove any grease or organic compounds. In an exemplary embodiment, a degreasing bath having an aqueous, non-silicate alkaline solution containing a surfactant may be utilized to clean the substrate. In an exemplary embodiment, the composition of the degreasing bath includes non-silicate chemistry for removing any organic contaminants from the surface of the substrate. In another non-limiting embodiment, the surface pre-treatment may include an elevated temperature soak in substantially pure water. As will be appreciated by those of skill in the art, these surface pre-treatment procedures are susceptible to a wide array of alternatives. Thus, it is contemplated that any number of other procedures and practices may likewise be utilized such as, for example, by mechanical methods or by immersion or spray cleaner systems in order to perform the pre-treatment process of the substrate.

Following surface pre-treatment 12, the pre-treated substrate is subjected to a corrosion inhibitive conversion coating 14 with a trivalent chromium-containing layer in order to protect the surface of the pre-treated heat exchanger from corrosion and enhance adhesion of a corrosion inhibitive compound in a subsequent electro-coating. The conversion treatment process is an autocatalytic conversion coating process which is carried out by immersing the pre-treated heat exchanger into the conversion treatment bath for a predetermined contact time and temperature. The treatment bath includes an aqueous solution having a salt of hexafluorozirconic acid and a water soluble trivalent chromate compound, which is free of hexavalent chromium. In one exemplary embodiment, the trivalent chromate compound is trivalent chromium sulfate. The water soluble trivalent chromate compound is present in the aqueous solution in sufficient concentrations to coat the surfaces of the pre-treated heat exchanger with a uniform layer of trivalent chromium having an average thickness of 100 nm. In one exemplary embodiment, the aqueous solution can include Surtec 650, which is a commercially available liquid trivalent chromium based chemical available from CST-SurTec, Inc. In a non-limiting embodiment, the pre-treated heat exchanger is immersed for about 10 minutes at ambient temperature of about 30 degree Celsius (about 303 Kelvin) to about 40 degree Celsius (about 313 Kelvin) in order to induce the conversion coating on the surface. In other non-limiting embodiments, the aqueous solution may contain fluoride and fluoborate. It is to be appreciated that the acidic fluoride character of the conversion coating solution removes the native oxide films and replaces it with hydrated Al—Zr—O—F layer, which increases the hydrophilicity of the surface of the substrate and activates the surface for organic coating. In an embodiment, the conversion coated heat exchanger substrate is evaluated by visual inspection. Thereafter, in one exemplary embodiment, the conversion coated heat exchanger substrate (also called a conversion coated heat exchanger) is subjected to a corrosion inhibitive electro-coating 16 (or "e-coat" 16).

In an embodiment, e-coat 16 is a cathodic electrophoretic coating process performed in a bath of de-ionized water. The bath includes an organic corrosion inhibitor for supplementing the corrosion protection. The conversion coated heat exchanger is used as a cathode while the organic corrosion inhibitor is suspended in the bath. In a non-limiting embodiment, the organic corrosion inhibitor used is available from PPG® but, in other embodiments, other similar corrosion inhibitors such as, for example, strontium chromate pigment may also be used without departing from the scope of the invention. E-coat 16 may be performed by applying a negative DC charge to the chromium coated heat exchanger. The oppositely charged polymer molecules in the bath are drawn to the cathodic heat exchanger and deposit on the surface of the conversion coated heat exchanger. In one embodiment, a charge is applied to coat the conversion coated heat exchanger with a uniform layer of the corrosion-inhibited electrophoretic coating having an average thickness of about 25 µm. The e-coated heat exchanger is dried at elevated temperature and time sufficient to cure the polymer coating. In an embodiment, the heat exchanger is dried for a time between 20 minutes to 30 minutes at about 160 degree Celsius (about 433 Kelvin) to about 170 degree Celsius (about 443 Kelvin). In an alternative embodiment, an anodic electrocoating may also be used in lieu of cathodic electrocoating.

In an exemplary embodiment, following electro-coating 16, the e-coated heat exchanger is subjected to surface coating process including an application of a solvent borne solution containing a corrosion inhibitive top coat 18. Particularly, the e-coated heat exchanger is sprayed with a solution containing a liquid polyurethane coating having pigments that include a corrosion inhibitor. In one embodiment, the solvent borne solution contains, for example, HybriCor™ 204 from WPC Technologies, Inc in sufficient concentrations in order to suppress corrosion. In other embodiments, similar corrosion inhibitors such as strontium chromate pigment may also be used without departing from the scope of the invention. Also, the topcoat 16 is cured (i.e., cured-to-touch) for 20 minutes at elevated temperature after allowing solvents to flash off in an ambient environment. In another embodiment, the topcoat 16 is cured for a time of between 30 minutes to 45 minutes at about 60 degree Celsius (about 333 Kelvin) to about 70 degree Celsius (about 343 Kelvin). As will be appreciated by those of skill in the art, these surface preparation, coating and post-treatment procedures are susceptible to a wide array of alternatives. Thus, it is contemplated that any number of other procedures and practices may likewise be utilized to perform these processes of the aluminum alloy heat exchanger. In one embodiment, the heat exchanger may include a chemical etching to remove any oxide layers on the surface, followed by a conversion coating process 14, followed by electro-coating 16. Lastly, the heat exchanger surface is dried and dipped into a solvent bath for corrosion inhibitive top coat 18.

The technical effects and benefits of exemplary embodiments include a method for providing an adherent multi-layered coating with substantial corrosion resistance on the substrate of the heat exchanger. In embodiments, the method includes a surface pre-treatment of the heat exchanger, a conversion coating, an electro-coating process, and an optional surface coating of the heat exchanger. The surface pre-treatment includes at least one step to ensure that the surface of the heat exchanger is clean and free of residues and foreign materials. Another coating process enables a film of a trivalent chromium compound to be uniformly coated on the aluminum alloy heat exchanger substrate using an autocatalytic conversion coating process. Further, the heat exchanger is electro-coated by applying a corrosion inhibitive film on the substrate surface. Also, an optional topcoat application is used to supplement the corrosion protection on the surface in a solution containing an ultraviolet pigment, corrosion inhibitor and polyurethane.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for coating an aluminum alloy heat exchanger, comprising:
    subjecting at least one surface of the heat exchanger to a pre-treatment process including cleaning;
    conversion coating the at least one surface of the heat exchanger with a trivalent chromium compound;
    subjecting the at least one conversion coated surface to an electro-coating in an aqueous solution containing an organic corrosion inhibitor; and
    subjecting the at least one electro-coated surface to a surface coating including application of a top coat of a solvent borne coating composition comprising a corrosion inhibiting pigment.

2. The method of claim 1, wherein the solvent borne coating composition comprise as polyurethane.

3. The method of claim 1, wherein the conversion coating further comprises immersing the heat exchanger in a conversion treatment bath having dissolved species of a water soluble trivalent chromium compound and a salt of hexafluorozirconic acid.

4. The method of claim 3, wherein the trivalent chromium compound is trivalent chromium sulfate.

5. The method of claim 1, wherein the conversion coating further comprises immersing the heat exchanger in a conversion treatment bath for a predetermined contact time in an ambient temperature environment.

6. The method of claim 1, wherein the conversion coating further comprises spraying a solution containing the trivalent chromium compound onto the at least one surface.

7. The method of claim 1, wherein the pre-treatment process further comprises at least one of vapor degreasing using trichloroethylene and solvent emulsion cleaning.

8. The method of claim 1, wherein the heat exchanger comprises fins, tubes, or plates.

9. The method of claim 1, wherein the electro-coating further comprises subjecting the heat exchanger to a cathodic electro-coating with the heat exchanger being the cathode.

10. The method of claim 1, wherein the electro-coating further comprises subjecting the heat exchanger to an anodic electro-coating with the heat exchanger being the anode.

* * * * *